United States Patent [19]

Heffelfinger

[11] 3,815,571
[45] June 11, 1974

[54] FOLDABLE AND PORTABLE GRILL
[76] Inventor: John F. Heffelfinger, 14927 Kenton, Midlothian, Ill. 60445
[22] Filed: Apr. 12, 1973
[21] Appl. No.: 350,619

[52] U.S. Cl. .............................. 126/9 R, 126/25 R
[51] Int. Cl. ............................................ F24c 1/16
[58] Field of Search ................. 126/9 R, 25 R, 25 A

[56] References Cited
UNITED STATES PATENTS

| | | | |
|---|---|---|---|
| 497,275 | 5/1893 | Glasmann | 126/9 R |
| 2,061,336 | 11/1936 | Stuart | 126/25 R |
| 2,244,935 | 6/1941 | Bincer | 126/9 R |
| 2,530,166 | 11/1950 | Johannsen | 126/25 R |
| 2,576,750 | 11/1951 | Clark | 126/9 R |
| 3,087,414 | 4/1963 | Gannon | 126/25 R X |
| 3,698,376 | 10/1972 | Webb | 126/9 R |

Primary Examiner—Carroll B. Dority, Jr.
Assistant Examiner—Harold Joyce
Attorney, Agent, or Firm—Sabin C. Bronson

[57] ABSTRACT

A portable cooking unit comprising sheet metal ends and sides. The sides are each made of two sections, foldable relative to each other and to the ends so as to fold inwardly and form a barrier between the ends. A grill is pivotally connected on one of the ends and a grate on the other of the ends. The folded side wall sections form a partition or barrier between the grill and grate.

4 Claims, 7 Drawing Figures

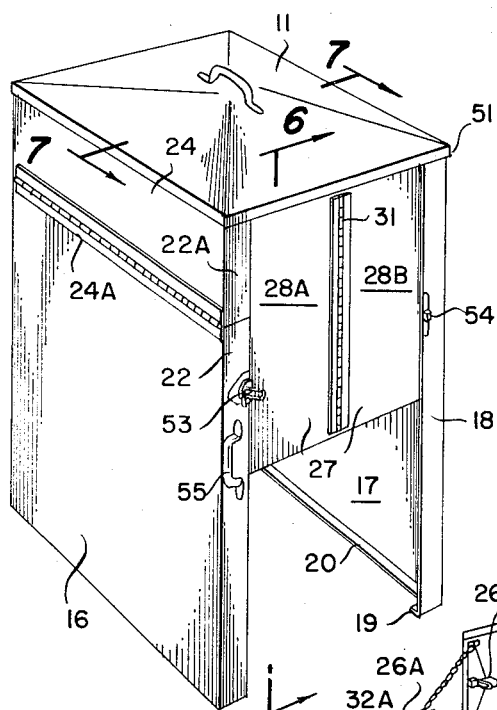
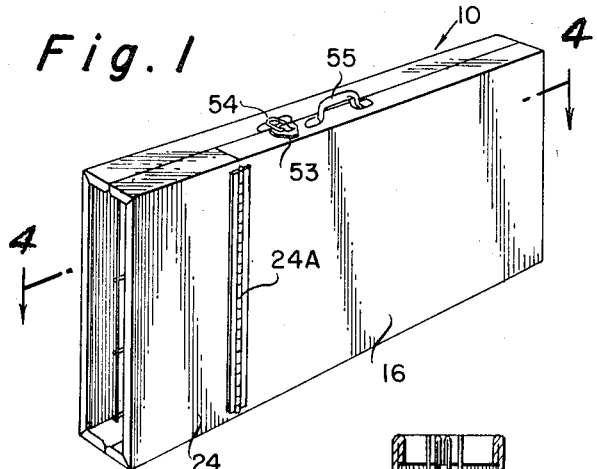
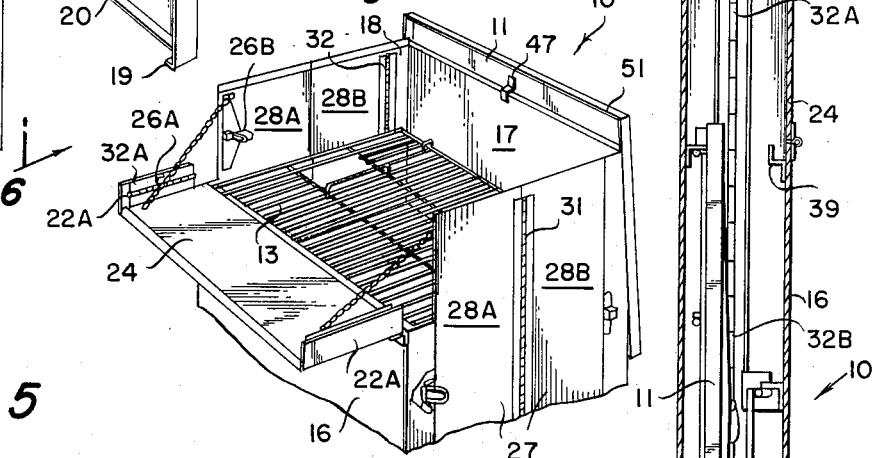
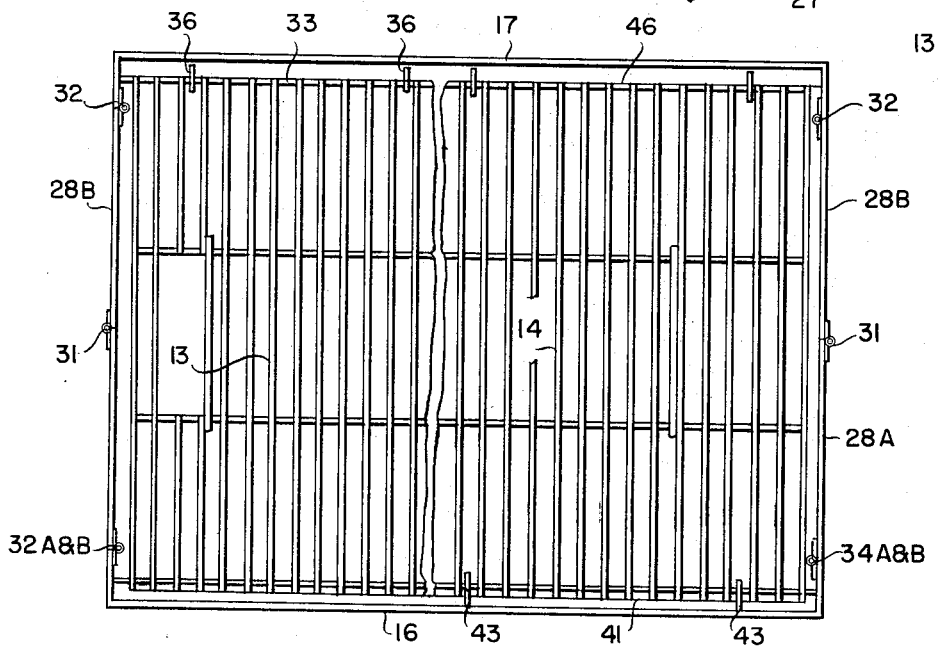

3,815,571

FOLDABLE AND PORTABLE GRILL

BACKGROUND - SUMMARY - DRAWINGS

The present invention relates to an outdoor cooking unit such as braziers and barbeques, and more particularly to portable outdoor cooking units constructed and arranged to be foldable into a compact carrying case.

Heretofore portable braziers or barbeques have been constructed such that the elements or components have either required complete disassembly or were folded without major disassembly into carrying cases. These latter type carrying case structures were generally proportioned such that the resulting structure was large and difficult to handle. Moreover, such structures merely indiscriminately folded the fire box and the grills and grates so that it was advisable that these elements be thoroughly cleaned before folding in order to prevent undue caking of the ash on the normally greasy grill.

By the present invention it is proposed to provide a portable brazier or barbeque which overcomes the difficulties encountered heretofore.

This is accomplished generally by a brazier structure including a pair of end panels to which a pair of side panels are hingedly attached. The side panels each include a pair of sections hingedly connected along a common edge substantially between the hinge connections to the end panels. A grill is pivotally connected to one end wall and a grate is pivotally connected to the opposite end wall. This makes it possible for the side wall sections to fold between the grill and the grate, and thereby providing a separating barrier therebetween in the collapsed or folded carrying case condition of the brazier.

A further feature of the present invention is the provision of a cover which is receivable within the folded collapsed condition of the brazier.

A further feature of the invention is the provision of a hingedly connected upper section on one of the end panels which is optionally folded between an upright position and a lateral or horizontal position. In the horizontal position the upper section provides a work shelf when the brazier is utilized as a barbeque.

Further features of the invention will hereinafter appear when considered in the light of the accompanying drawings, in which;

FIG. 1 is a perspective view of the brazier of the present invention shown with the brazier in the folded carrying case position.

FIG. 2 is a perspective view showing the brazier in the set-up position, for cooking solid meats or fowl, and/or smoking product.

FIG. 3 is a fragmentary perspective view of the brazier shown in the position for performing barbequeing, in the conventional manner.

FIG. 4 is a cross sectional view taken generally along the line 4—4 of FIG. 1.

FIG. 5 is a top plan view of FIG. 2 with the cover removed.

Figure 7:
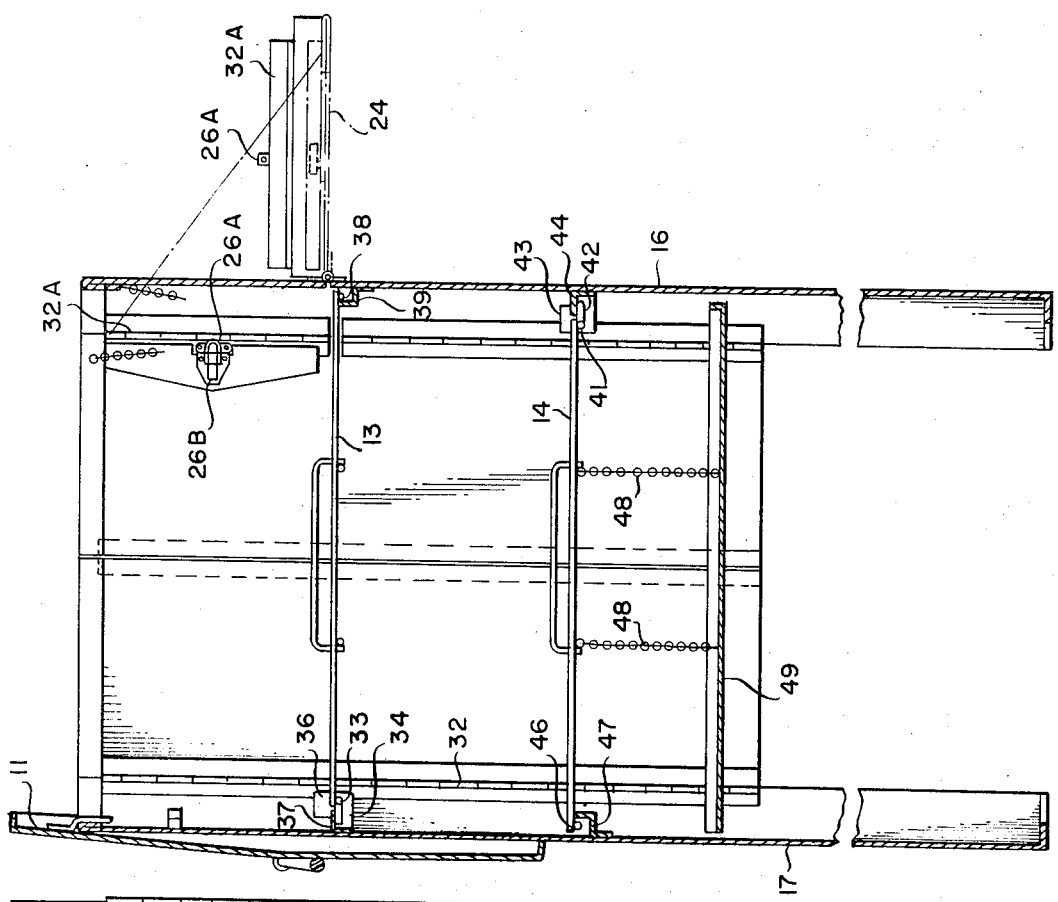
FIG. 7 is a view taken generally along the lines 7—7 of FIG. 2.

Referring now to the drawings there is shown a brazier 10 embodying the structure of the present invention. The brazier 10 is adapted to be used in its usual condition with a cover 11 sealing the grill portion as shown in FIG. 2 or as a barbeque with the cover 11 removed as illustrated in FIG. 3. The brazier and barbeque are both foldable into the carrying case arrangement as shown in FIG. 1, with provisions for interior cover storage.

The brazier comprises generally a frame, a grill 13, a grate 14, and an ashpan 49. The frame is made from sheet metal of relatively heavy gauge steel, aluminum, or the like, and includes a front wall 16, a rear wall 17. The rear wall 17 includes side legs 18—18 bent at right angles to the remainder of the wall. The legs 18—18 each terminate in flanges 19—19, the lower ends of which are at the same level as a flange 20 along the lower edge of the end wall 17.

The front end wall includes a lower front wall section 16 having side leg flanges 22—22 and base flange 23. An upper front section 24 is connected to the upper edge of the lower section 16 by means of a hinge 24a. The hinge 24a is connected to the outer face of the end wall 16 and to the outer face of the upper front wall 24. The front wall section also includes upper side flanges 22a of the same width as the flanges 22 so as to be aligned with the lower side flanges 22 as shown in FIG. 2.

As shown in FIGS. 2 and 3 the upper front section 24 is hingedly movable between the position shown in FIG. 2 to provide a continuous front wall or to the right angular position as shown in FIG. 3 to serve as a work table or support when the unit 10 is used as a conventional barbeque. The upper front wall 24 is held in the aligned or erect position by means of latch elements 26a and 26b fastened to the inside of hinge 32a and the inner face of side walls 28a. A chain extending between the side walls 28a and the upper end wall 24 serves to hold the latter in a horizontal position upon release of the latch elements 26a and 26b.

The side walls 27—27 each include side wall sections 28a and 28b connected in side-by-side relationship by a hinge 31 suitably secured to the outer faces as by welding. The outer vertical edges of the side wall sections 28b are connected to the respective side flange 18 by hinges 32 as by welding to the inside faces thereof. Hinges 32 are fixed as by welding to the inside faces of the flanges 18, and the inside of the side sections 28b connecting the latter to the rear end 17. One of the leaves of hinges 32 is welded to the upper side flanges 22a. The other of the leaves carries the latch members 26b the side sections 28a are fastened thereto for pivoting or hinging about the hinges 32a.

Figure 6:
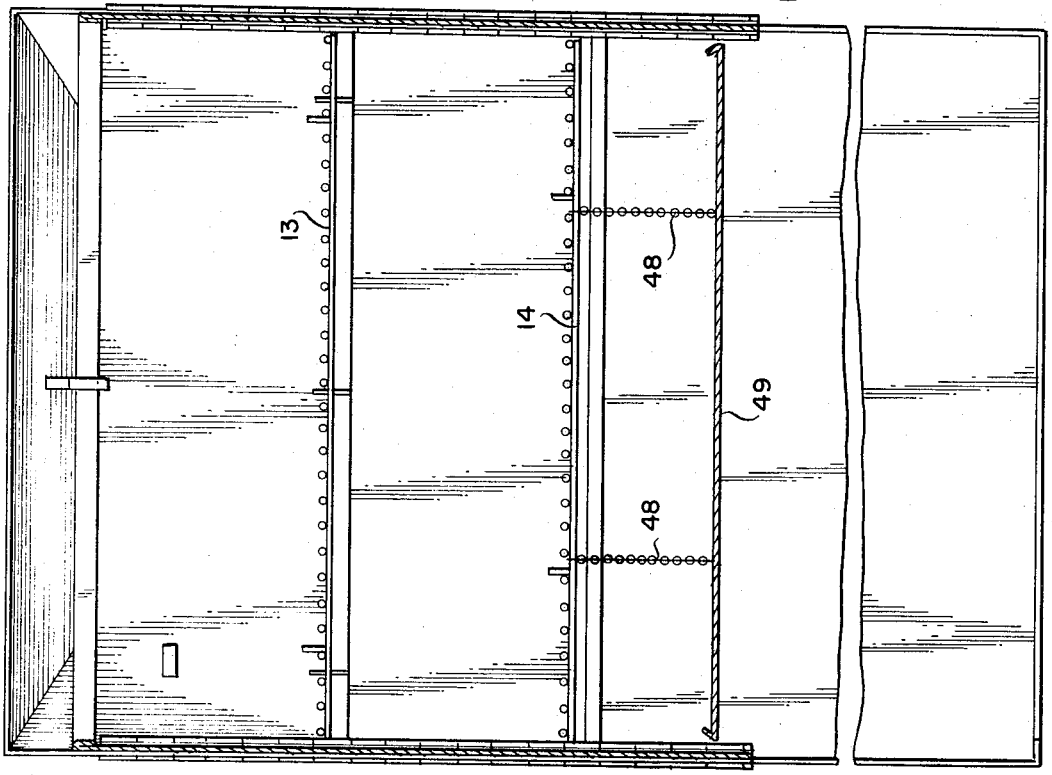
FIG. 6 is a view taken generally along the lines 6—6 of FIG. 2.

The grill 13 as shown in FIGS. 3, 6 and 7 is of more or less standard construction including a plurality of right angularly arranged rods welded together. One of the transversely extending rods 33 is received in slots 34 of hooked shaped brackets 36 fixed as by welding to an angle iron 37 secured to and extending along the inside face of the end wall 17. The front transverse rod 38 is supported by a Z-bar 39 fixed to the lower front wall section 16. The grill 13 when detachable from the supporting engagement with the Z-bar 39 is pivotally supported on the hinge brackets 36 fixed to the rear wall 17.

The grate 14 is also made from an intersecting welded rod structure and includes a front rod 41 which is disposed in slots 42 of hinge brackets 43 fixed to an angle iron 44 welded to the lower front wall 16. A rear rod 46 is supported in a Z-bar 47 fixed to rear wall 17 as by welding. Chains 48 suspend a tray 49 from the grate 14. The tray serves to collect the coals and ashed dropped through the grate. The grate 14 and tray 49 form the combustion elements of the unit and are hingedly supported on the hinge brackets when separated from supporting engagement with the Z-bar 47.

The top 11 includes a depending flange 51 which snugly seats about the upper ends of the side walls 27 and front and end walls 24 and 17 when the unit is used as a brazier. The top 11 may include a vent for controlling the draft to the grate 14.

When the unit is used as a barbeque the top 11 is removed and a hanger clip 47 secured thereto may be used to suspend the top from the rear wall 17. At the same time the latch elements 26a and 26b may be released so that upper front wall section 24 serves as a work table as shown in FIG. 3.

To fold the unit into a carrying case as shown in FIG. 1, the upper front section 24 is latched by the members 26a and 26b. The grill 13 is released from supporting engagement with the Z-bar 39. The grill is then pivoted downwardly about the hinge brackets 36 so as to be adjacent the rear wall 17. At the same time the grate 14 is released from supporting engagement with the Z-bar 47 and pivoted downwardly about the pivot brackets 43 to lie adjacent the front wall 16. Of course, the tray 49 is folded thereagainst simultaneously.

Thereafter, the side wall sections 28a and 28b are folded inwardly about the hinges 31 and 32. As shown in FIG. 4 when thus folded, the sections 28a and 28b form a barrier between the grill 13 and the combustion elements including the grate 14 and tray 49.

The flanges 18 and 22 may be provided with latch members 53 and 54 for latching the folded unit into a carrying case. A suitable handle 55 may also be attached.

I claim:

1. An outdoor cooking unit comprising a frame including a front wall, rear wall, and opposing side walls, said side walls, each including a pair of end-to-end hingedly connected sections, first means hingedly connecting one of said sections to said front wall, second means hingedly connecting the other of said sections to said rear wall, said sections being hinged connected to fold inwardly between said front and rear walls to form a carrying case, grill means detachably supported on said front and rear walls, and grate means detachably supported between said front and rear walls, below said grill means, said grill means being hingedly supported on said rear wall and adapted to fold along the inner side of said rear wall, said grate means being hingedly attached to said front wall and adapted to fold along the inner side of said front wall, said foldable side sections being foldable inwardly between said grill means and said grate means to form a barrier when said unit is folded into a carrying case.

2. The invention as defined in claim 1 wherein said front wall includes an upper front wall section including a section hingedly connected so as to be movable between a position in alignment with the remainder of the front wall and a position at right angles to the remainder of the wall to provide a work surface.

3. The invention as defined in claim 2 wherein said unit includes a cover seatable on said unit when said upper front wall section is positioned in alignment with the remainder of said front wall section.

4. The invention as defined in claim 1 wherein said grate includes a tray suspended therefrom by chains.

* * * * *